(12) United States Patent
Shen et al.

(10) Patent No.: US 11,811,586 B2
(45) Date of Patent: Nov. 7, 2023

(54) METHOD AND APPARATUS FOR CONFIGURING ALARM RULE OF IOT DEVICE, DEVICE, AND STORAGE

(71) Applicants: ENVISION DIGITAL INTERNATIONAL PTE. LTD., Singapore (SG); SHANGHAI ENVISION DIGITAL CO., LTD., Shanghai (CN)

(72) Inventors: Jieyuan Shen, Shanghai (CN); Lang Ming, Shanghai (CN)

(73) Assignees: ENVISION DIGITAL INTERNATIONAL PTE. LTD., Singapore (SG); SHANGHAI ENVISION DIGITAL CO., LTD, Shanghai (CN)

( * ) Notice: Subject to any disclaimer, the term of this patent is extended or adjusted under 35 U.S.C. 154(b) by 0 days.

(21) Appl. No.: 17/777,029

(22) PCT Filed: Nov. 13, 2020

(86) PCT No.: PCT/SG2020/050658
§ 371 (c)(1),
(2) Date: May 14, 2022

(87) PCT Pub. No.: WO2021/096431
PCT Pub. Date: May 20, 2021

(65) Prior Publication Data
US 2022/0353130 A1 Nov. 3, 2022

(30) Foreign Application Priority Data
Nov. 14, 2019 (CN) .......................... 201911113595.0

(51) Int. Cl.
*H04L 41/0631* (2022.01)
*H04L 41/0681* (2022.01)
*H04L 43/065* (2022.01)

(52) U.S. Cl.
CPC ...... *H04L 41/0631* (2013.01); *H04L 41/0681* (2013.01); *H04L 43/065* (2013.01)

(58) Field of Classification Search
CPC ............. H04L 41/0631; H04L 41/0681; H04L 43/065
See application file for complete search history.

(56) References Cited

U.S. PATENT DOCUMENTS 11,228,614 B1 * 1/2022 Clark .................... H04L 63/302
2010/0321183 A1 * 12/2010 Donovan ......... G08B 13/19693
340/540

(Continued)

FOREIGN PATENT DOCUMENTS

CL 202201174 A 5/2022
CN 108494622 A 9/2018

(Continued)

OTHER PUBLICATIONS

International Search Report and Written Opinion of International Searching Authority dated Mar. 29, 2021 for International Application No. PCT/SG2020/050658.

(Continued)

*Primary Examiner* — Philip C Lee
(74) *Attorney, Agent, or Firm* — JCIP; Joseph G. Chu; Jeremy I. Maynard

(57) ABSTRACT

The present disclosure discloses a method and an apparatus for configuring an alarm rule for an IoT device, and a device and a storage medium thereof, which are applied to the field of IoT. The method includes: configuring at least two groups of alarm rules for a plurality of IoT devices of the same type in an IoT; obtaining n usage categories of the plurality of IoT (Continued)

devices by categorizing the plurality of IoT devices according to usage characteristics of the plurality of IoT devices; calculating a correlation between the at least two groups of the alarm rules and the n usage categories, and storing a corresponding relationship between a target usage category and a target alarm rule whose correlation is higher than a condition; and when an IoT device belonging to the target usage category is newly added, configuring an alarm rule of the newly added IoT device as the target alarm rule.

6 Claims, 10 Drawing Sheets

(56) References Cited

U.S. PATENT DOCUMENTS

| | | | |
|---|---|---|---|
| 2014/0330756 A1 | 11/2014 | Thapliyal et al. | |
| 2015/0009031 A1* | 1/2015 | Bedros | G08B 13/122 340/566 |
| 2018/0041546 A1 | 2/2018 | Gomez et al. | |
| 2018/0144139 A1 | 5/2018 | Cheng et al. | |
| 2018/0205793 A1* | 7/2018 | Loeb | G06T 19/003 |
| 2018/0212768 A1 | 7/2018 | Kawashima et al. | |
| 2018/0234519 A1 | 8/2018 | Boyapalle | |
| 2019/0098028 A1 | 3/2019 | Ektare et al. | |
| 2019/0140906 A1* | 5/2019 | Furuichi | H04L 41/0866 |
| 2022/0103431 A1* | 3/2022 | Singh | H04L 67/5682 |

FOREIGN PATENT DOCUMENTS

| | | |
|---|---|---|
| CN | 109636129 A | 4/2019 |
| EP | 2838226 A1 | 2/2015 |
| EP | 2894813 A1 | 7/2015 |
| JP | 2004-320267 A | 11/2004 |
| JP | 2011159232 A | 8/2011 |
| JP | 2018124913 A | 8/2018 |
| KR | 1020110127701 A | 11/2011 |
| KR | 1020140016041 A | 2/2014 |
| KR | 1020150121126 A | 10/2015 |
| KR | 101678606 B1 | 12/2016 |
| KR | 1020190078685 A | 7/2019 |

OTHER PUBLICATIONS

International Preliminary Report on Patentability dated Jan. 7, 2022 for International Application No. PCT/SG2020/050658.
Notice of Reasons for Refusal dated Dec. 13, 2022 for Japanese Application No. 2022-527700.
Notice of Preliminary Rejection dated Dec. 5, 2022 for Korean Application No. 10-2022-7020024.
Extended European Search Report dated Nov. 30, 2022 for European Application No. 20886947.9.
Notice for Eligibility of Grant with Examination Report from Intellectual Property Office of Singapore dated Feb. 17, 2023 for Singapore Application No. 11202204958Q.
Substantive Examination Adverse Report dated Jan. 3, 2023 for Malaysian Application No. PI2022002494.
Notice of Decision to Grant a Patent dated May 1, 2023 for Japanese Application No. 2022-527700.
Notice of Allowance dated Apr. 19, 2023 for Korean Application No. 10-2022-7020024.
Examination Report No. 1 dated Mar. 29, 2023 for Australian Application No. 2020383198.
Search Report of INAPI dated Jul. 17, 2023 for Chilean Application No. 202201237.
Examination Report dated Aug. 22, 2023 for European Application No. 20866947.9.

* cited by examiner

METHOD AND APPARATUS FOR CONFIGURING ALARM RULE OF IOT DEVICE, DEVICE, AND STORAGE

TECHNICAL FIELD

The present disclosure relates to the field of Internet, and in particular, relates to a method and apparatus for configuring alarm rules for an Internet of things (IoT) device, and a device and a storage medium thereof.

BACKGROUND

With the development of the IoT technology, IoT devices have emerged. IoT devices are devices connected to the IoT for unified monitoring and management. When an IoT device triggers an alarm rule, for example, if the IoT device fails or a parameter of the IoT device reaches a hazardous range, the IoT device may issue an alarm to indicate that the IoT device is in a hazardous state.

In the related art, since various performances and parameters of the IoT devices of the same type or similar types are similar, the same alarm rules are uniformly configured for these IoT devices. Exemplarily, IoT devices of the same type or similar types include at least one of the following devices: devices of the same model, devices of similar models, devices of the same model but of different production batches, and devices of the same model, of the same production batch but of different service ages. However, even for the same type of IoT devices, due to differences in the use environment, service age, frequency, geographic location, or the like of the IoT devices, the IoT devices may be different in performance or parameters. If the same alarm rules are set, the alarms for some IoT devices are not sensitive, and potential safety hazards may be present.

SUMMARY

Embodiments of the present disclosure provide a method and apparatus for configuring an alarm rule for an IoT device, and a device and a storage medium thereof, which can solve the problem that for the same type or similar types of IoT devices, due to differences in the use environment, service age, frequency, geographic location, or the like of the IoT devices, the IoT devices may be different in some performance or parameters such that if the same alarm rules are set, the alarms for some IoT devices are not sensitive, and there are potential safety hazards. The technical solutions are as below.

According to one aspect of embodiments of the present disclosure, a method for configuring an alarm rule for an IoT device is provided. The method includes:

configuring at least two groups of alarm rules for a plurality of IoT devices of the same type in an IoT;

obtaining n usage categories of the plurality of IoT devices by categorizing the plurality of IoT devices according to usage characteristics of the plurality of IoT devices;

calculating a correlation between the at least two groups of the alarm rules and the n usage categories, and storing a corresponding relationship between a target usage category and a target alarm rule whose correlation is higher than a condition; and when an IoT device belonging to the target usage category is newly added, configuring an alarm rule of the newly added IoT device as the target alarm rule.

According to another aspect of embodiments of the present disclosure, an apparatus for configuring an alarm rule for an IoT device is provided. The apparatus includes:

a configuring module, operable to configure at least two groups of alarm rules for a plurality of IoT devices of the same type in an IoT;

a categorizing module, operable to obtain n usage categories of the plurality of IoT devices by categorizing the plurality of IoT devices according to usage characteristics of the plurality of IoT devices;

a calculating module, operable to calculate a correlation between the at least two groups of the alarm rules and the n usage categories; and a storing module, operable to store a corresponding relationship between a target use category and a target alarm rule whose correlation is higher than a condition;

wherein the configuring module is further operable to: when an IoT device belonging to the target use category is newly added, configure an alarm rule of the newly added IoT device as the target alarm rule.

According to another aspect of embodiments of the present disclosure, an IoT device is provided. The IoT device includes a processor, and a memory storing at least one instruction, at least one program, or a code set or instruction set therein. The at least one instruction, the at least one program, or the code set or instruction set, when loaded and executed by the processor, enables the processor to perform the method according to the above aspect.

According to another aspect of embodiments of the present disclosure, a computer-readable storage medium is provided. The computer-readable storage medium stores at least one instruction, at least one program, or a code set or instruction set therein. The at least one instruction, the at least one program, or the code set or instruction set, when loaded and executed by the processor, enables the processor to perform the method according to the above aspect.

The technical solutions of the embodiments of the present disclosure at least achieve the following beneficial effects.

By configuring at least two groups of alarm rules for a plurality of IoT devices of the same type in an IoT, alarm rules related with some usage characteristics are acquired based on the usage characteristics of the IoT devices. When a new IoT device is added, a proper alarm rule is configured for the new IoT device according to the usage characteristics related with the alarm rules. Alarm rules can be configured differently for the same type of the IoT devices, such that the alarm sensitivity of the IoT devices is improved, thereby reducing potential safety hazards.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DERAILED DESCRIPTION

For clearer descriptions of the objectives, technical solutions and advantages in the present disclosure, the present disclosure is described in detail below in combination with the accompanying drawings.

Firstly, the terms involved in the embodiments of the present disclosure are described below.

The Internet of things (IoT) refers to real-timely collecting various required information such as sound, light, heat, electricity, mechanics, chemistry, biology, location of any object or process requiring monitoring, connection, and interaction by any information sensor, radio frequency identification technology, global positioning system, infrared sensor, laser scanner and other devices and technologies, so as to implement the ubiquitous connection between things and things, things and people, and implement the smart perception, recognition and management of things and processes by various types of possible network access. The IoT is an information carrier based on the Internet and traditional telecommunications networks, and allows all ordinary physical objects that can be independently addressed to form an interconnected network.

An alarm rule is a generation condition or trigger condition of the alarm. When an event that meets the generation condition occurs, the device detects the event and generates an alarm message. For example, the generation condition may be that an alarm is generated when one or several parameters of the device meet a threshold.

Figure 1:
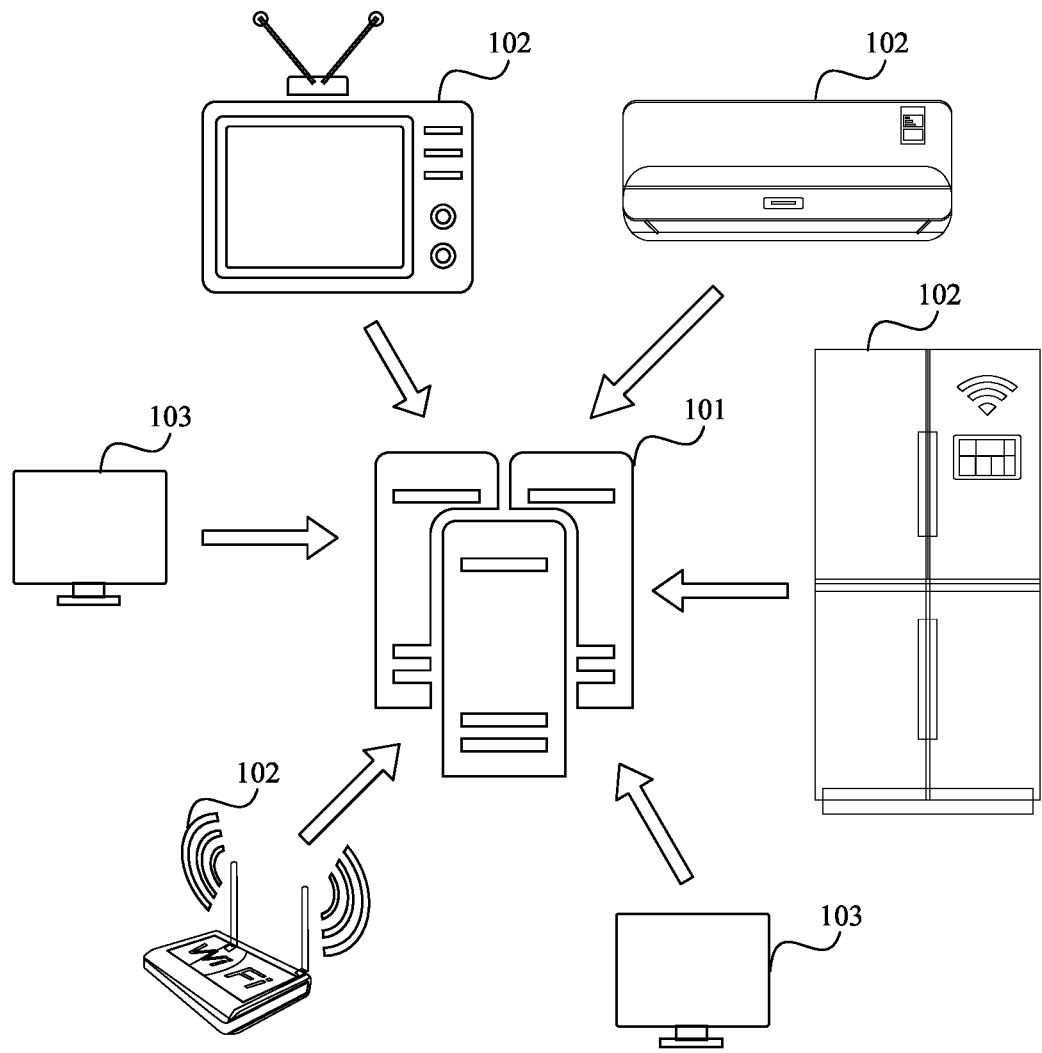
FIG. 1 is a block diagram of an IoT system according to an exemplary embodiment of the present disclosure.

Referring to FIG. 1, FIG. 1 is a schematic diagram of an IoT system according to an embodiment of the present disclosure. The IoT system may include a server cluster 101, an IoT device 102, and a computer device 103.

The server cluster 101 is a cluster that integrates a plurality of servers for computing and storing data information. In the embodiments of the present disclosure, the server cluster 101 includes at least one server. In the embodiments of the present disclosure, the server cluster further includes an IoT platform which stores an alarm rule of an IoT device 102. The IoT platform is capable of receiving alarm information of the IoT device 102, or receiving other information of the IoT device 102 and the computer device 103. Optionally, the IoT platform is also capable of recommending an alarm rule for the IoT device according to the information sent by the IoT device. The IoT platform may be deployed in one or more servers, which is not limited in the embodiment of the present disclosure.

The IoT device 102 refers to a physical device with an IoT communication capability. The IoT device may include fans, transformers, production equipment, monitoring equipment, processing equipment, air conditioners, refrigerators, computers, or the like. Optionally, each IoT device 102 includes an alarm rule recommending module. The alarm rule recommending module is operable to recommend an alarm rule for the IoT device according to the characteristics of the IoT device.

The computer device 103 refers to a device capable of processing and storing data, such as a personal computer (PC), a server, or any electronic device with a computing capability, which is not limited in the embodiment of the present disclosure. The computer device 103 can be registered in the IoT platform in the server cluster 101 to perform subsequent operations and management of the IoT device 102, for example, controlling the IoT device 102 to start or stop operating.

The IoT device 102 and the computer device 103 are connected to the server cluster 101 over a network. The network may be either a wired network or a wireless network. For example, the IoT 102 and the server cluster 101, and the computer IoT device 103 and the server cluster 101 can be connected to each other either in the way of IoT device to IoT device (Ad-Hoc), or under the coordination of a base station or wireless access point (AP), or a gateway, such as a Zigbee gateway, which is not limited in the embodiment of the present disclosure.

Figure 2:
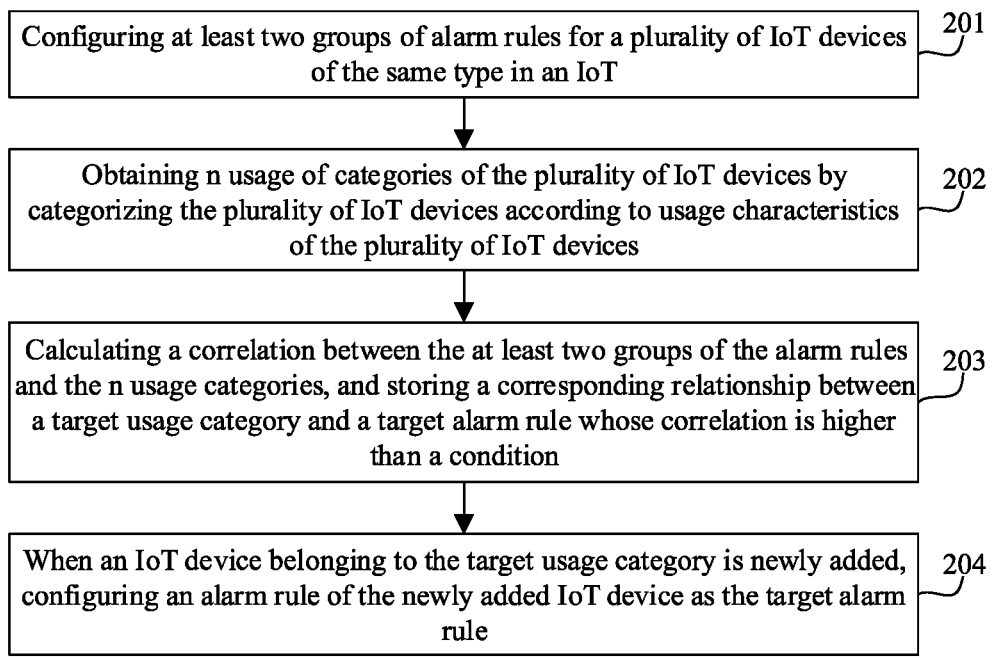
FIG. 2 is a flowchart showing a method for configuring an alarm rule for an IoT device according to an exemplary embodiment of the present disclosure.

FIG. 2 is a flowchart showing a method for configuring an alarm rule for an IoT device according to an exemplary embodiment of the present disclosure. The method is applicable to the server cluster 101 as shown in FIG. 1. The method includes the following steps:

In step 201, at least two groups of alarm rules are configured for a plurality of IoT devices of the same type in the IoT.

The server sets at least two groups of alarm rules for a plurality of IoT devices of the same type in the IoT.

Exemplarily, the server may either configure unified alarm rules for a plurality of IoT devices, or configure a single alarm rule for some IoT devices. Exemplarily, the server may configure unified alarm rules for a plurality of IoT devices, and may also configure a single alarm rule for some IoT devices. Exemplarily, the alarm rule of the IoT device may be manually modified on the IoT device.

The same type means that at least one of use, function, model, version, or production batch of the IoT devices is similar (the difference is less than the threshold) or the same. For example, vertical air conditioners and wall-mounted air conditioners belong to the same type of IoT devices, and speakers and headphones belong to the same type of IoT devices, or, the first-generation air conditioners and second-generation air conditioners belong to the same type of IoT devices, or, the IoT devices with the model No. 0010 belong to the same type of IoT devices.

An alarm rule is the generation condition or trigger condition for alarming the IoT device. When the IoT device meets the conditions for generating an alarm, the IoT device often fails, is in the state of danger, or has a hidden safety hazard. Alarm rules can be configured for various aspects of the IoT device, for example, for real-time parameters of the IoT device, for the working status of some components on the upper part of the IoT device, for the status of products being processed on the IoT device, for environmental parameters on the surround of the IoT device, and for the status of the sensor on the IoT device, or the like. For example, when the infrared sensor of the IoT device senses infrared rays, the IoT device meets the alarm rules and therefore generates an alarm; when the environmental temperature is higher than 30° C., the IoT device meets the alarm rules and therefore generates an alarm; and when the current on the IoT device is higher than 10 amps, the IoT device meets the alarm rules and therefore generates an alarm. Exemplarily, different alarm rules for the IoT device may generate alarms corresponding to the alarm rules. For example, an alarm rule configured for the current of the IoT device may generate a current alarm.

Exemplarily, a group of alarm rules includes conditions for generating at least one alarm. For example, a group of alarm rules includes conditions for generating two alarms. For example, the first group of alarm rules is that the oxygen concentration in the environment is lower than 21% and the voltage of the IoT device is higher than 220 V. Exemplarily, one type of alarms corresponds to a group of alarm rules.

Exemplarily, at least two groups of different alarm rules are configured for a plurality of IoT devices of the same type.

In step 202, n usage categories of the plurality of IoT devices are obtained by categorizing the plurality of IoT devices according to usage characteristics of the plurality of IoT devices.

The server obtains n usage categories of the plurality of IoT devices by categorizing the plurality of IoT devices according to usage characteristics of the plurality of IoT devices.

The usage characteristics are the distinguishing characteristics of IoT devices in use. Exemplarily, the usage characteristics include at least one of usage habit characteristics, usage environment characteristics, usage geographic location characteristics, or real-time usage characteristics of the IoT devices.

The usage environment characteristics are the characteristics of the usage environment that are generated when a plurality of IoT devices are located in different locations in a region; the usage geographic location characteristics are the characteristics of the usage environment that are generated by regional differences when a plurality of IoT devices are located in different regions; the real-time usage characteristics are a part of the parameters of the IoT devices in the use process. The usage habit characteristics include at least one of the usage way, frequency, usage peak period, and types of other IoT devices used in conjunction with the IoT device. The usage environment characteristics at least one of temperature, humidity, altitude, noise, interference, power supply voltage stability, natural wind, or oxidation speed of the IoT devices. The usage geographic location characteristics include at least one of the latitude and longitude of the location, region, solar elevation angle, climate, air quality, or radiation of the IoT devices. The real-time usage characteristics include at least one of real-time current, voltage, wind speed, or power of the IoT device.

The usage category includes a plurality of category results obtained by categorizing the IoT devices according to usage characteristics. Exemplarily, the usage category categorizes the IoT devices based on usage characteristics in one or a plurality of dimensions. For example, according to the first usage characteristics, the IoT devices are categorized into two category results that are greater than or equal to a first threshold, and less than the first threshold.

Exemplarily, the IoT devices may be categorized into a plurality of usage categories according to one usage characteristics of the IoT devices. For example, according to the usage frequency of the IoT devices, the IoT devices may be placed into three categories: usage frequency of less than three times a week, usage frequency of four to twenty times a week, and usage frequency of more than twenty times a week.

Exemplarily, the IoT devices may be categorized into a plurality of usage categories according to a plurality of usage characteristics of the IoT devices. For example, according to the geographic location of the IoT devices and the type of power supply of the IoT devices, the IoT devices can be placed into four categories: Beijing with AC power supply, Beijing with DC power supply, Shanghai with AC power supply, and Shanghai with DC power supply.

In step 203, a correlation between the at least two groups of the alarm rules and the n usage categories is calculated, and a corresponding relationship between a target usage category and a target alarm rule whose correlation is higher than a condition is stored.

The server calculates a correlation between the at least two groups of the alarm rules and the n usage categories, and stores a corresponding relationship between a target usage category and a target alarm rule whose correlation is higher than a condition.

Correlation is an evaluation index for judging whether the alarm rule correlates to the usage category. Exemplarily, the correlation is used to describe the degree of correlation between the alarm rule and the usage category. Exemplarily, the correlation means that the configuration of the alarm rule is related to the usage characteristics corresponding to the usage category. For example, after the IoT device is used for a long service time, the current of the IoT device will increase due to its aging circuit, i.e., the normal current of a normal IoT device is 6 amps, after the circuit is aging, the normal current of this IoT device becomes 8 amps. Correspondingly, the alarm rule of the current needs to be adjusted to generate an alarm when the current exceeds 8 amps, which shows that the current alarm rule correlates to the service time of the IoT device. Exemplarily, a causal relationship is present between a part of correlated alarm rules and the usage categories, or the usage category affects the alarm rule.

Exemplarily, the correlation can be obtained through a quantitative calculation method, or the correlation can be judged according to the logical closeness of the causal relationship, or the correlation can be obtained through experiments. For example, a usage category of the IoT device may be used as a variable, and changing the usage category. If the alarm rule still applies to the IoT device after the usage category is changed, the usage category does not correlate to the alarm rule. If the alarm rule does not apply to the IoT device after the usage category is changed, the usage category correlates to the alarm rule.

The condition is a criterion for judging whether the alarm rule correlates to the usage category. A target usage category and a target alarm rule whose correlation is higher than a condition is that the target alarm rule correlates to the target usage category. The conditions can be configured according to the calculation or judgment of the correlation. For example, when the correlation is obtained by quantitative calculations, the condition may be that the correlation is greater than or less than the threshold. For example, when the correlation is greater than the threshold, the correlation is higher than the condition.

When a group of alarm rules correlates to a type of usage category, the alarm rule is the target alarm rule, and the usage category is the target usage category corresponding to the target alarm rule.

Exemplarily, the server will store the one-to-one corresponding target usage category and target alarm rule.

Exemplarily, the server will find out from the n usage categories in step 202 at least one corresponding usage category for each group of alarm rules according to at least two groups of alarm rules in step 201, and store the alarm rule and the usage category.

In step 204, when an IoT device belonging to the target usage category is newly added, an alarm rule of the newly added IoT device is configured as the target alarm rule.

When an IoT device belonging to the target usage category is newly added, the server may configure an alarm rule of the newly added IoT device as the target alarm rule.

Exemplarily, when an IoT device belonging to the target usage category is newly added, the server may find out the target usage category corresponding to the usage characteristics according to usage characteristics of the newly added IoT device, obtain the target alarm rule corresponding to the target usage category according to the target usage category of the newly added IoT device, and configure the target alarm rule as the target alarm rule of the newly added IoT device.

Exemplarily, the newly added IoT device is an IoT device that is newly connected to the IoT, or an IoT device that already exists in the IoT.

Exemplarily, when a newly added IoT device is an IoT device that is newly connected to the IoT, that is, no alarm rule is originally configured for the newly added IoT device, the one-to-one correspondence between the target alarm rule and the target usage category can be used to configure alarm rules for the newly added IoT device.

Exemplarily, when the newly added IoT device is an IoT device that already exists in the IoT, that is, at least one group of alarm rules are originally configured for the newly added IoT device, the one-to-one correspondence between the target alarm rule and the target usage category can be used to re-configure alarm rules for the newly added IoT device.

Exemplarily, the server may recommend the alarm rule for the newly added IoT device according to the stored target alarm rule and the target usage category in step 203.

Exemplarily, the server can also distribute one-to-one corresponding target alarm rules and target usage categories to the alarm rule recommending module of each IoT device, and the alarm rule recommending module recommends the alarm rule for the current IoT device according to the category results of the current IoT device.

In summary, in the method according to this embodiment, by configuring at least two groups of alarm rules for a plurality of IoT devices of the same type in an IoT, alarm rules related with some usage characteristics are acquired based on the usage characteristics of the IoT devices. When an IoT device is newly added, a proper alarm rule is configured for the new IoT device according to the usage characteristics related with the alarm rules. Alarm rules can be configured differently for the same type of the IoT devices, such that the alarm sensitivity of the IoT devices is improved, thereby reducing potential safety hazards.

Exemplarily, the present disclosure further provides a method for configuring at least two groups of alarm rules for a plurality of IoT devices. Exemplarily, the present disclosure further provides a method for obtaining a one-to-one corresponding target alarm rules and target usage categories.

Figure 3:
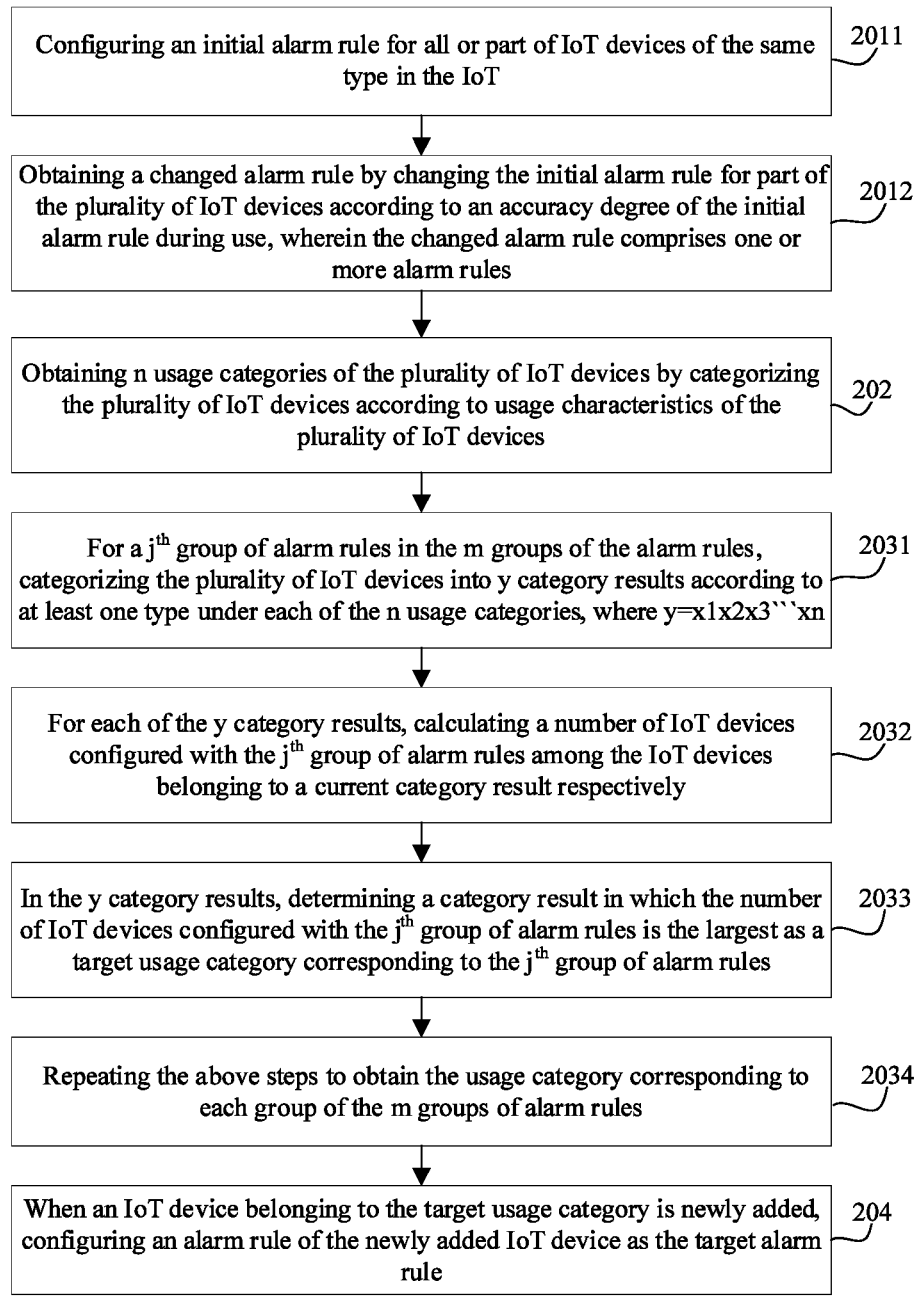
FIG. 3 is a flowchart showing a method for configuring an alarm rule for an IoT device according to an exemplary embodiment of the present disclosure.

FIG. 3 is a flowchart showing a method for configuring an alarm rule for an IoT device according to another exemplary embodiment of the present disclosure. The method is applicable to the server cluster 101 as shown in FIG. 1. The at least two groups of the alarm rules according to an exemplary embodiment as shown in FIG. 2 include m groups of alarm rules; and an $i^{th}$ category in the n usage categories includes $x_i$ types, wherein m is an integer greater than 1, and i and $x_i$ are integers greater than 0 respectively. The method includes the following steps:

In step 2011, an initial alarm rule is configured for all or part of IoT devices of the same type in the IoT.

The server sets an initial alarm rule for all or part of IoT devices of the same type in the IoT.

Exemplarily, the same alarm rule is initially configured for a plurality of IoT devices in the IoT.

Exemplarily, the initial alarm rule is the same alarm rule configured for IoT devices of the same type or similar types.

In step 2012, a changed alarm rule is obtained by changing the initial alarm rule for part of the plurality of IoT devices according to an accuracy degree of the initial alarm rule during use, wherein the changed alarm rule includes one or more alarm rules.

The server changes the initial alarm rule for part of the plurality of IoT devices according to an accuracy degree of the initial alarm rule during use to obtain a changed alarm rule.

Exemplarily, during the use of the IoT device, the alarm rules of some IoT devices can be individually adjusted. For example, when the alarm of an IoT device does not match the actual situation, the alarm rule of the IoT device can be manually adjusted to obtain the changed alarm rule.

Exemplarily, the changed alarm rule can be an adjustment either to the initial alarm rule, or to the newly added alarm rule, that is, the IoT device with the newly added alarm rules possesses two groups of alarm rules: the changed alarm rule and the initial alarm rule.

Exemplarily, the accuracy degree refers to the degree of conformity between the alarm rule and the actual situation of the alarm. When the alarm rule can accurately alarm the abnormal situation of the IoT device, the accuracy degree of the alarm rule is high. On the contrary, the accuracy degree of the alarm rule is low.

In step 202, n usage categories of the plurality of IoT devices are obtained by categorizing the plurality of IoT devices according to usage characteristics of the plurality of IoT devices.

Exemplarily, the usage characteristics include at least one of a use duration, a geographical location, a use scene, a topological relation, a use frequency, an average load, or a peak load.

Exemplarily, the usage category includes: less than 1 hour per day, 1 to 8 hours per day, and more than 8 hours per day based on use time of a plurality of IoT devices; the northern hemisphere and the southern hemisphere based on geographic location of a plurality of IoT devices.

In step 2031, for a $j^{th}$ group of alarm rules in the m groups of the alarm rules, the plurality of IoT devices are categorized into y category results according to at least one type under each of the n usage categories, where $y=x_1 x_2 x_3 \ldots x_n$.

For a $j^{th}$ group of alarm rules in the m groups of the alarm rules, the server categorizes the plurality of IoT devices into y category results according to at least one type under each of the n usage categories, where $y=x_1 x_2 x_3 \ldots x_n$.

Exemplarily, in one usage category, the IoT devices are categorized into at least one type according to one usage characteristic. For example, according to usage characteristics of use scene, the IoT devices may be categorized into those used in the environment of high temperature and pressure, and those used in the environment of normal temperature and pressure.

Exemplarily, the $i^{th}$ category includes $x_i$ types; wherein $x_i$ is an integer greater than 1, and i is an integer greater than 1 but less than n.

Figure 4:
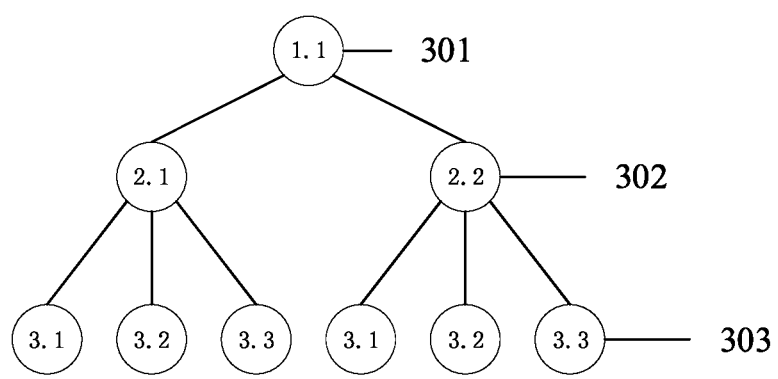
FIG. 4 is a schematic diagram of category results according to an exemplary embodiment of the present disclosure.

Exemplarily, the category results are defined according to a plurality of types of the n usage categories. Exemplarily, a categorization is performed according to the tree diagram, the first layer has x1 types of the first usage category, each type of x1 types in the second layer corresponds to x2 types of the second usage category, and each type of x1*x2 types in the third layer corresponds to x3 types of the third usage category, such that y category results can be obtained, y=x1x2x3 . . . xn. For example, as shown in FIG. 4, the first layer 301 of the tree diagram has one type 3.1 of the first usage category; the second layer 302 has two types 2.1 and 2.2 of the second usage category corresponding to one type of the first usage category; the third layer 303 has three types 3.1, 3.2, and 3.3 of the third usage category corresponding to two types 2.1 and 2.2 of the second usage category respectively.

Exemplarily, a plurality of IoT devices can be categorized into y category results according to n usage categories, wherein, y=x1x2x3 . . . xn. For example, the first category includes x1=3 types, the second category includes x2=5 types, and the third category includes x3=2 types. The IoT devices can be categorized into 3*5*2=30 category results according to these three categories.

Exemplarily, there may be any integer number of IoT devices in each category result. For example, no IoT device is included in one category result, while 100 IoT devices are included in another category result.

For example, as shown in Table 1, the 9 IoT devices are categorized according to service time, production batch, and location, such that the category results shown in Table 1 are obtained.

A first category result: less than one year, produced ten years ago, northern hemisphere: device 1, device 2.

A second category result: less than one year, produced ten years ago, southern hemisphere: device 3.

A third category result: less than one year, produced in the recent ten years, northern hemisphere: device 4.

A fourth category result: less than one year, produced in the recent ten years, southern hemisphere.

A fifth category result: more than one year, produced ten years ago, northern hemisphere: device 5, device 6, device 7.

A sixth category result: more than one year, produced ten years ago, southern hemisphere.

A seventh category result: more than one year, produced in the recent ten years, northern hemisphere: device 8, device 9.

An eighth category result: more than one year, produced in the recent ten years, southern hemisphere.

In step 2032, for each of the y category results, a number of IoT devices configured with the $j^{th}$ group of alarm rules among the IoT devices belonging to a current category result is calculated.

For each of the y category results, the server calculates a number of IoT devices configured with the $j^{th}$ group of alarm rules among the IoT devices belonging to a current category result respectively;

Exemplarily, for the $j^{th}$ group of alarm rules in the m-groups of alarm rules, the number of IoT devices configured with the $j^{th}$ group of alarm rules in the y category result is calculated. For example, in the y category results, 5 IoT devices in the first category result are configured with the $j^{th}$ group of alarm rules, and in the second category result, 10 IoT devices are configured with the $j^{th}$ group of alarm rules. In the third category result, no IoT device are configured with the $j^{th}$ group of alarm rules, until the number of IoT devices configured with the $j^{th}$ group of alarm rules corresponding to each of the y category result is calculated.

Exemplarily, as shown by the category result of Table 1, the number of IoT devices configured with the $j^{th}$ group of alarm rules in the first category result is calculated. For example, if the device 1 is configured with the $j^{th}$ group of alarm rules, the calculating result of the first category result is 1; similarly, the number of IoT devices configured with the $j^{th}$ group of alarm rules for each of the second category result to the eighth category result is calculated.

In step 2033, for the y category results, a category result in which the number of IoT devices configured with the $j^{th}$ group of alarm rules is the largest is determined as a target usage category corresponding to the $j^{th}$ group of alarm rules.

For the y category results, the server determines a category result in which the number of IoT devices configured with the $j^{th}$ group of alarm rules is the largest as a target usage category corresponding to the $j^{th}$ group of alarm rules.

For example, in three category results, 5 IoT devices in the first category result are configured with the $j^{th}$ group of alarm rules; in the second category result, 10 IoT devices are configured with the $j^{th}$ group of alarm rules; and in the third category result, no IoT device is configured with the $j^{th}$ group of alarm rules, the number of IoT devices configured with the $j^{th}$ group of alarm rules in the second category result is the largest, i.e., the second category result is the target usage category corresponding to the $j^{th}$ group of alarm rules.

Exemplarily, in the y category results, a category result in which the number of IoT devices configured with the $j^{th}$ group of alarm rules is the greatest and greater than the threshold is determined as a target usage category corresponding to the $j^{th}$ group of alarm rules. For example, the threshold is the value obtained by dividing the number of IoT devices with the $j^{th}$ group of alarm rules in all IoT devices by y.

Exemplarily, one thousand devices are categorized into eight category results according to the categorization method as shown in Table 1. The number of IoT devices

TABLE 1

| Service time | Less than one year | | | | More than one year | | | |
|---|---|---|---|---|---|---|---|---|
| Production batch | Produced ten years ago | | Produced in the recent ten years | | Produced ten years ago | | Produced in the recent ten years | |
| Location | Northern hemisphere | Southern hemisphere | Northern hemisphere | Southern hemisphere | Northern hemisphere | Southern hemisphere | Northern hemisphere | Southern hemisphere |
| Device | Device 1 and device 2 | Device 3 | Device 4 | | Device 5, device 6, and device 7 | | Device 8 and device 9 | | configured with the $j^{th}$ group of alarm rules from the first category result to the eighth category result is 10, 10, 5, 30, 800, 1, 74, and 70 respectively. Then the number of IoT devices configured with the $j^{th}$ group of alarm rules in the fifth category result is the largest, and the fifth category result is the target usage category corresponding to the $j^{th}$ group of alarm rules. That is, the target usage category corresponding to the $j^{th}$ group of alarm rules is: more than one year of service time, production batch produced ten years ago and the location in the northern hemisphere. Then, if is an IoT device that has a service life of more than one year is newly added to a production batch produced ten years ago and is located in the northern hemisphere, the $j^{th}$ group of alarm rules is recommended for the IoT device.

In step 2034, the usage category corresponding to each group of the m groups of alarm rules is obtained by repeating the above steps.

The server repeats the above steps to obtain the target usage category corresponding to each group of the m groups of alarm rules.

Exemplarily, steps 2031, 2032, and 2033 are repeated to obtain the target usage category corresponding to for a $(j+1)^{th}$ group of alarm rules of m groups of alarm rules until the target usage category corresponding to each group of the m groups of alarm rules is obtained. That is, a one-to-one corresponding target alarm rule and target usage classification is obtained.

Exemplarily, the $j^{th}$ group of alarm rules is any one of the m groups of the alarm rules.

In step 204, when there is a newly added IoT device belonging to the target usage category, an alarm rule of the newly added IoT device is configured as the target alarm rule.

In summary, in the method provided in the present embodiment, the alarm rule of some IoT devices is manually fine-tuned after a unified alarm rule is configured for the IoT devices, and the real-time data characteristics corresponding to the alarm rule according to the fine-tuned alarm rule and the real-time data characteristics of the fine-tuned IoT device are obtained. When the newly-added IoT device has this real-time data characteristic, the same fine-tuned alarm rule is configured for the newly-added IoT device, such that more suitable alarm rules can be configured specifically for the same type of IoT devices according to different use scenes, thereby improving the sensitivity of the alarm rules and reducing potential security risks.

A plurality of category results are obtained according to a plurality of usage characteristics of the IoT device, and the number of IoT devices configured with a group of alarm rules in each category result is calculated to calculate the correlation between the alarm rules and usage categories so as to obtain the usage category corresponding to the target alarm rules.

Exemplarily, the present disclosure also provides another method for obtaining target usage category and target alarm rules.

Figure 5:
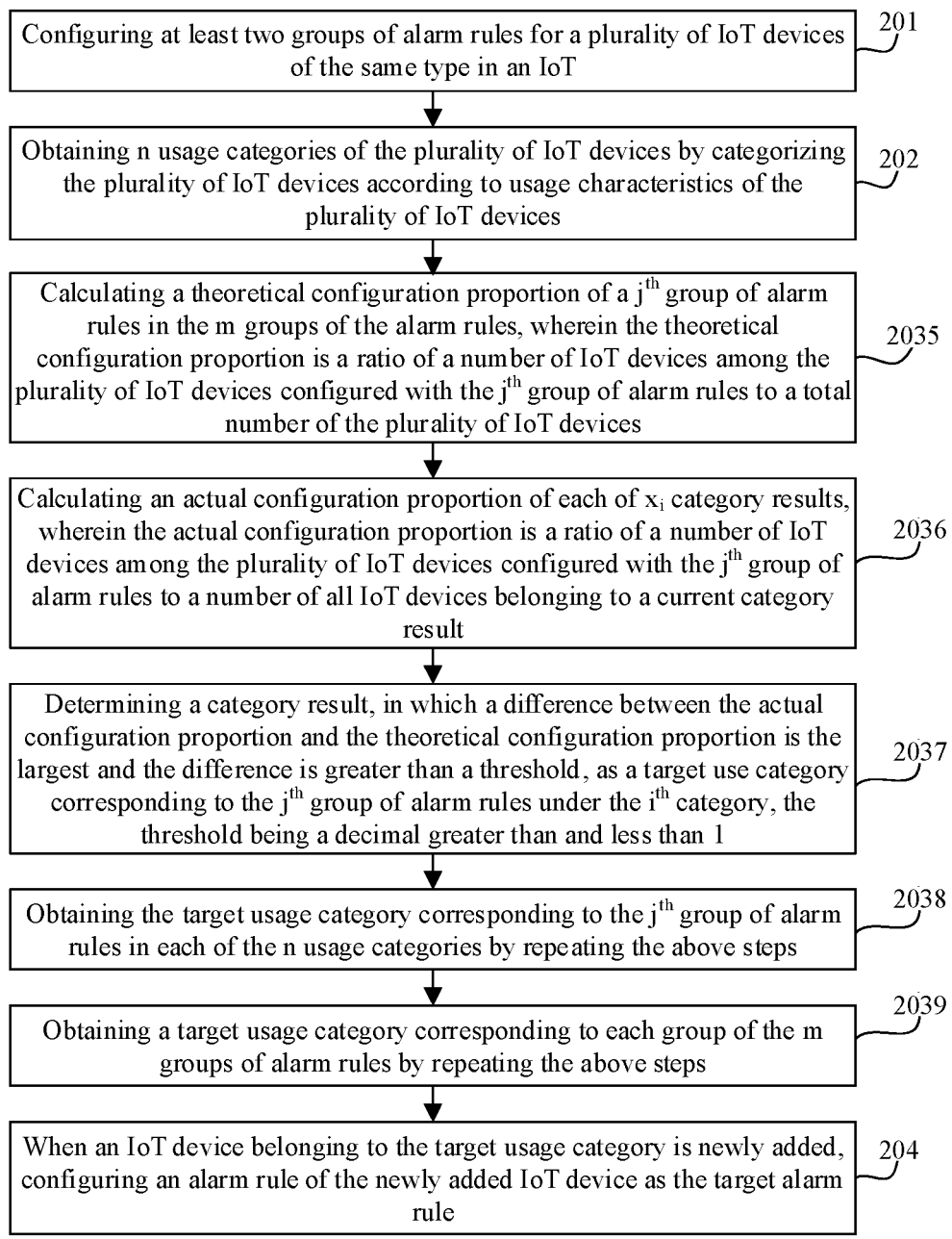
FIG. 5 is a flowchart showing a method for configuring an alarm rule for an IoT device according to an exemplary embodiment of the present disclosure.

FIG. 5 is a flowchart showing a method for configuring an alarm rule for an IoT device according to an exemplary embodiment of the present disclosure. The method is applicable to the server cluster 101 as shown in FIG. 1. At least two groups of the alarm rules includes m groups of the alarm rules; and an $i^{th}$ category in the n usage categories includes $x_i$ types, wherein m is an integer greater than 1, and i and $x_i$ are integers greater than 0 respectively. Different from the exemplary embodiment as shown in FIG. 2, in this method, step 203 is replaced by the following steps.

In step 2035, a theoretical configuration proportion of a $j^{th}$ group of alarm rules in the m groups of the alarm rules is calculated, wherein the theoretical configuration proportion is a ratio of a number of IoT devices among the plurality of IoT devices configured with the $j^{th}$ group of alarm rules to a total number of the plurality of IoT devices.

The server calculates a theoretical configuration proportion of a $j^{th}$ group of alarm rules in the m groups of the alarm rules.

The theoretical configuration proportion is the ratio of the number of IoT devices configured with a group of alarm rules in all IoT devices to the total number of all IoT devices.

In step 2036, an actual configuration proportion of each of $x_i$ category results is calculated, wherein the actual configuration proportion is a ratio of the number of IoT devices among the plurality of IoT devices configured with the $j^{th}$ group of alarm rules to a number of all IoT devices belonging to a current category result.

The server calculates an actual configuration proportion of each of $x_i$ category results.

Exemplarily, for the $x_i$ category results under one category obtained in step 2306, the number of IoT devices configured with the $j^{th}$ group of alarm rules in each category result is calculated, and the actual configuration proportion of the number of all IoT devices in the category result is calculated.

The actual configuration proportion is, after the category result is obtained by categorizing the IoT devices, the proportion of the number of IoT devices configured with a group of alarm rules in a category result accounting for the total number of all IoT devices.

Exemplarily, if the actual configuration proportion in each category result is not much different from the theoretical configuration proportion after IoT devices are categorized into x category results by using a usage category, the IoT devices configured with the $j^{th}$ group of alarm rules are evenly distributed in each category result, that is, the usage category does not correlate to the $j^{th}$ group of alarm rules. On the contrary, if the actual configuration proportion is very different from the theoretical configuration proportion, then the IoT devices configured with the $j^{th}$ group of alarm rules are centrally distributed in a part of category results, that is, the partial category results are the target usage category correlating to the $j^{th}$ group of alarm rules.

In step 2037, a category result, in which a difference between the actual configuration proportion and the theoretical configuration proportion is the largest and the difference is greater than a threshold, is determined as a target use category corresponding to the $j^{th}$ group of alarm rules under the $i^{th}$ category, the threshold being a decimal greater than 0 and less than 1.

The server determines a category result, in which a difference between the actual configuration proportion and the theoretical configuration proportion is the largest and the difference is greater than a threshold, as a target use category corresponding to the $j^{th}$ group of alarm rules under the $i^{th}$ category, the threshold being a decimal greater than 0 and less than 1.

Exemplarily, the difference between the actual configuration proportion and the theoretical configuration proportion is the value of the actual configuration proportion minus the theoretical configuration proportion. When the actual configuration proportion is greater than the theoretical configuration proportion, the difference is a positive number; when the actual configuration proportion is less than the theoretical configuration proportion, the difference is a negative number.

Exemplarily, a difference between the actual configuration proportion and the theoretical configuration proportion is the largest, i.e., if the IoT devices configured with the $j^{th}$ group of alarm rules are the most centrally distributed in this category result, the category result is the category result most correlating to the $j^{th}$ group of alarm rules.

Exemplarily, under the premise that the difference between the actual configuration proportion and the theoretical configuration proportion is the largest, whether the category result correlates to the $j^{th}$ group of alarm rules can be further judged by judging whether the difference is greater than the threshold. For example, the threshold is set to be 0.5; when the difference between the actual configuration proportion and the theoretical configuration proportion is the largest, and the difference is greater than 0.5, the category result is the target usage category corresponding to the $j^{th}$ group of alarm rules.

In step 2038, the above steps are repeated to obtain the target usage category corresponding to the $j^{th}$ group of alarm rules in each of the n usage categories.

The server repeats steps 2036 and 2037 to obtain the target usage category corresponding to the $j^{th}$ group of alarm rules in each of the n usage categories.

For a plurality of types in each of the n usage categories, whether there is a category result correlated to the $j^{th}$ group of alarm rules in each category is identified, the $j^{th}$ group of alarm rules and the category results correlated to the $j^{th}$ group of alarm rules are stored as corresponding target alarm rules and target usage categories.

In step 2039, a target usage category corresponding to each group of the m groups of alarm rules is obtained by repeating the above steps are repeated.

The server repeats steps 2035, 2036, 2037, and 2038 to obtain a target usage category corresponding to each group of the m groups of alarm rules.

Exemplarily, for each group of alarm rules in the m groups of alarm rules, the category results corresponding to each group of alarm rules in n usage categories are identified, and each group of alarm rules and its corresponding category result as the corresponding target alarm rule and target usage category are stored.

Exemplarily, the $j^{th}$ group of alarm rules is any group of alarm rules in the m groups of alarm rules, and the $i^{th}$ category is any one of the n usage categories.

In summary, in the method according to the present embodiment, according to each usage characteristic, the correlation between each category result under each usage characteristic and the alarm rule respectively is obtained so as to obtain a one-to-one correspondence between a category result under a usage characteristic and a group of alarm rules, and obtaining and storage of target alarm rules and target use categories are achieved.

Figure 6:
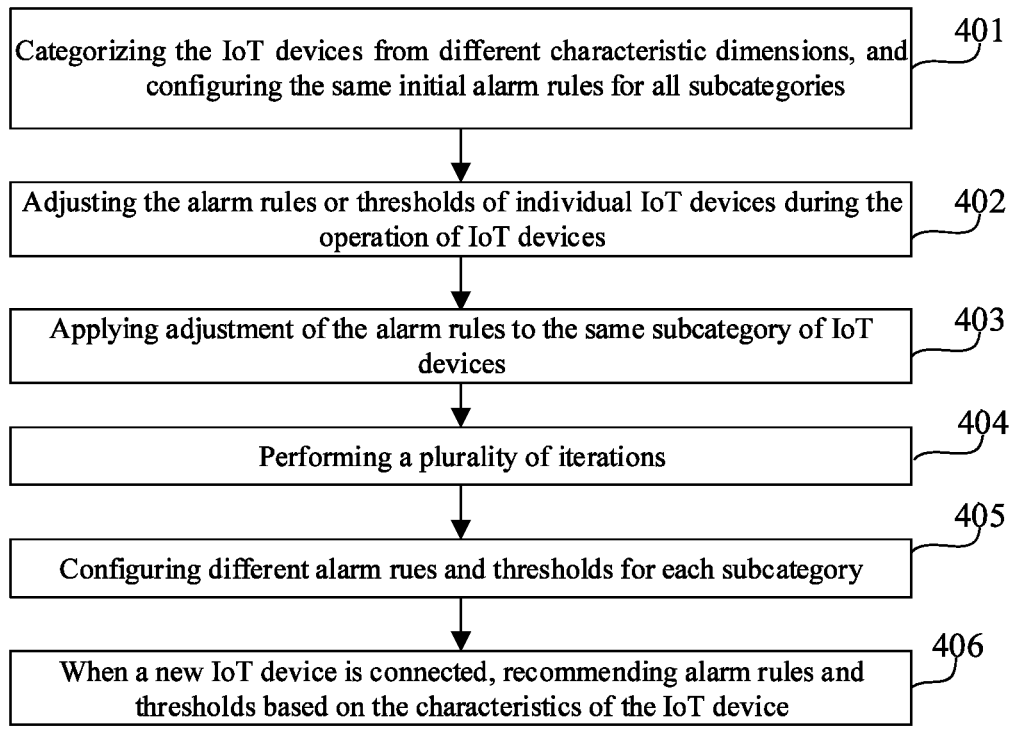
FIG. 6 is a flowchart showing a method for configuring an alarm rule for an IoT device according to an exemplary embodiment of the present disclosure.

FIG. 6 is a flowchart showing a method for configuring an alarm rule for an IoT device according to an exemplary embodiment of the present disclosure. The method is applicable to the server cluster 101 as shown in FIG. 1. The method includes the following steps.

In step 401, the IoT devices are categorized from different characteristic dimensions, and the same initial alarm rules are configured for all subcategories.

The server categorizes the IoT devices from different characteristic dimensions, and sets the same initial alarm rules for all sub-categories.

Figure 7:
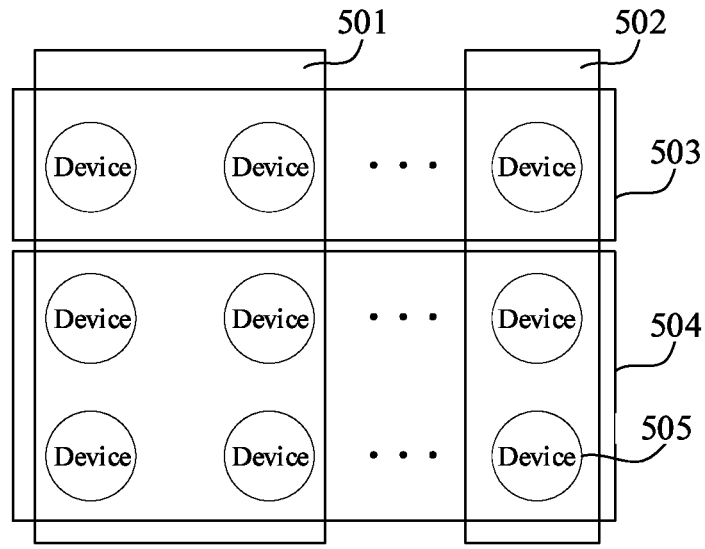
FIG. 7 is a schematic diagram of category results according to an exemplary embodiment of the present disclosure.

Exemplarily, as shown in FIG. 7, a plurality of IoT devices 505 may be categorized into a plurality of sub-categories from different usage characteristics. For example, the IoT devices may be placed into a first category 501 and a second category 502 according to the first usage characteristic, and a third category 503 and a fourth category 504 according to the second usage characteristic. That is, four sub-categories are obtained: the first category combined with the third category, the first category combined with the fourth category, the second category combined with the third category, and the second category combined with the fourth category.

Figure 8:
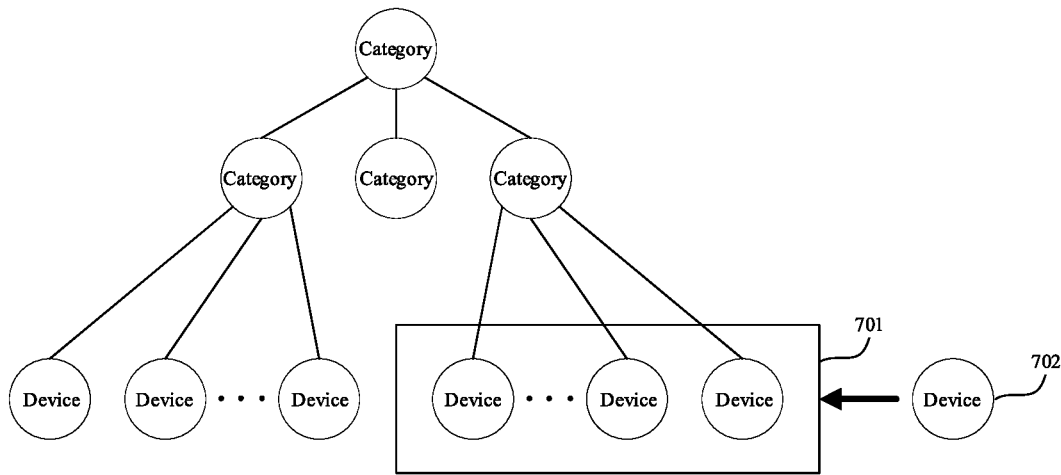
FIG. 8 is a schematic diagram of category results according to an exemplary embodiment of the present disclosure.

Exemplarily, the sub-categories of the IoT device can be obtained according to the topology structure of the IoT device. For example, according to the wind field, wind turbines can be categorized into the topology structures as shown in FIG. 8. The first group of IoT devices 701 is a subcategory. When a newly added IoT device 702 belonging to this subcategory joins the IoT, an alarm rule is recommended for the newly added IoT device 702 according to the alarm rules of the first group of IoT devices 701 recommends.

Exemplarily, for all IoT devices, no matter which subcategory thee IoT devices belong to, the initial alarm rules are configured for them.

In step 402, the alarm rules or thresholds of individual IoT devices are adjusted during the operation of IoT devices.

The server adjusts the alarm rules or thresholds of individual IoT devices during the operation of IoT devices.

Exemplarily, during the operation of IoT devices, the alarm rules are individually adjusted for some IoT devices with inaccurate alarms to the alarm rules to obtain the changed alarm rules.

In step 403, the adjustment of the alarm rules is applied to the same subcategory of IoT devices.

Exemplarily, according to the embodiment shown in FIG. 2, FIG. 3, or FIG. 5, according to the one-to-one correspondence between the usage categories of the I IoT devices and the alarm rules and the IoT and, the alarm rules are re-configured for some IoT devices.

For example, both IoT device A and IoT device B belong to the first category under the first usage category. The alarm rule of IoT device A is adjusted to obtain the second alarm rule during the operation of the IoT device. If the second alarm rule is correlated to the first category by calculating the correlation between the alarm rule and the usage category, the second alarm rule is also configured for the IoT device B.

In step 404, a plurality of iterations are performed.

Exemplarily, the server repeats steps 402 and 403, and after a long period of iterative adjustment, finally obtains a one-to-one correspondence between the target alarm rule with higher accuracy and the target usage category.

In step 405, different alarm rules and thresholds are configured for each subcategory.

Exemplarily, after step 404, the server obtains the one-to-one correspondence between the target alarm rule with high accuracy and the target usage category.

In step 406, when a new IoT device is connected, alarm rules and thresholds are recommended based on the characteristics of the IoT device.

When a new IoT device is connected, the server recommends alarm rules and thresholds based on the characteristics of the IoT device.

Exemplarily, when a new IoT device is connected, the server recommends an alarm rule for the newly added IoT device according to the one-to-one correspondence between the target alarm rule and the target usage category in step 405.

In summary, in the method provided in the present embodiment, the alarm rule of some IoT devices is manually fine-tuned after a unified alarm rule is configured for the IoT devices, and the real-time data characteristics corresponding to the alarm rule according to the fine-tuned alarm rule and the real-time data characteristics of the fine-tuned IoT device are obtained. When the newly-added IoT device has this real-time data characteristic, the same fine-tuned alarm rule is configured for the newly-added IoT device, such that more suitable alarm rules can be configured specifically for the same type of IoT devices according to different use scenes, thereby improving the sensitivity of the alarm rules and reducing potential security risks.

Figure 9:
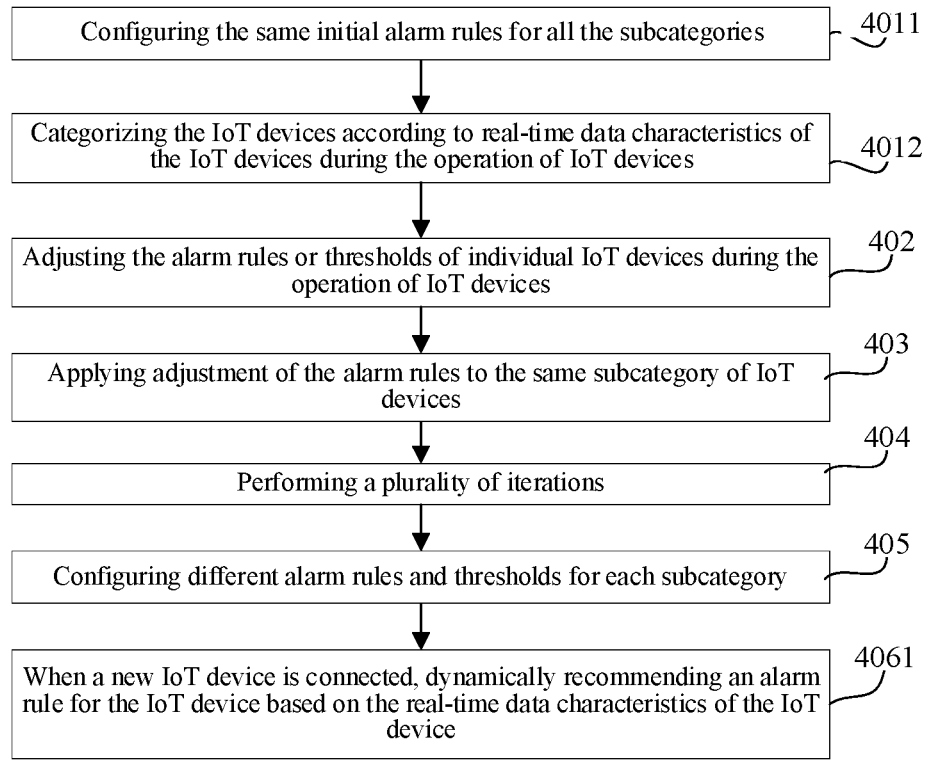
FIG. 9 is a flowchart showing a method for configuring an alarm rule for an IoT device according to an exemplary embodiment of the present disclosure.

FIG. 9 is a flowchart showing a method for configuring an alarm rule for an IoT device according to an exemplary embodiment of the present disclosure. The method is applicable to the server cluster 101 as shown in FIG. 1. The method includes the following steps.

In step 4011, the same initial alarm rules are configured for all the subcategories.

The server sets the same initial alarm rules for all the subcategories.

In step 4012, the IoT devices are categorized according to real-time data characteristics of the IoT devices during the operation of IoT devices.

The server categorizes the IoT devices according to real-time data characteristics of the IoT devices during the operation of IoT devices.

Exemplarily, the real-time data characteristics are the real-time usage characteristics. Real-time data includes the current, voltage, resistance, power, wind power, processing speed of the IoT device, or the like.

Figure 10:
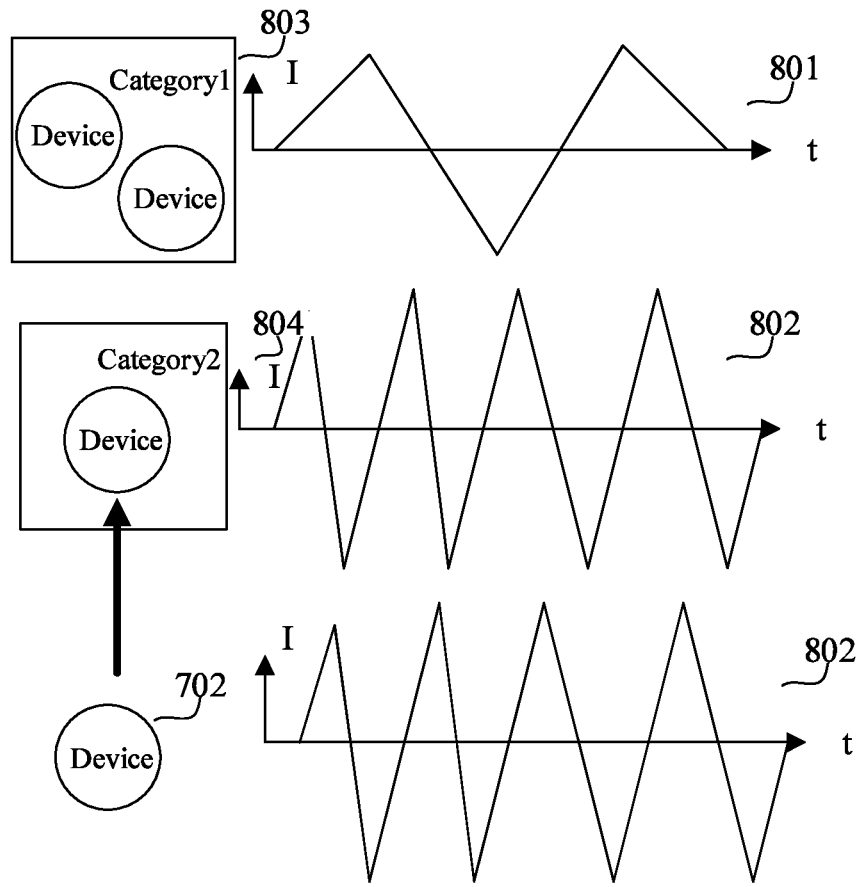
FIG. 10 is a schematic diagram of category results based on the currents category according to an exemplary embodiment of the present disclosure.

Exemplarily, the categorization is performed according to the current of the IoT device. As shown in FIG. 10, the IoT devices are categorized according to the different currents of the IoT device. The IoT device with the first type of current 801 belong to Type A 803, and the IoT device with the second type of current 802 belong to Type B 804.

In step 402, the alarm rules or thresholds of individual IoT devices are adjusted during the operation of IoT devices.

In step 403, the adjustment of the alarm rules is applied to the same subcategory of IoT devices.

In step 404, a plurality of iterations are performed.

In step 405, different rules and thresholds are configured for each subcategory.

In step 4061, when a new IoT device is connected, an alarm rule is dynamically recommended for the IoT device based on the real-time data characteristics of the IoT device.

When a new IoT device is connected, the server dynamically recommends an alarm rule for the IoT device based on the real-time data characteristics of the IoT device.

Exemplarily, as shown in FIG. 10, when the newly added IoT device 702 also has the second type of current 802, an alarm rule is recommended for the newly added IoT device 702 according to the alarm rules of the type B of IoT device 804.

In summary, in the method provided in the present embodiment, the alarm rule of some IoT devices is manually fine-tuned after a unified alarm rule is configured for the IoT devices, and the real-time data characteristics corresponding to the alarm rule according to the fine-tuned alarm rule and the real-time data characteristics of the fine-tuned IoT device are obtained. When the newly-added IoT device has this real-time data characteristic, the same fine-tuned alarm rule is configured for the newly-added IoT device, such that more suitable alarm rules can be configured specifically for the same type of IoT devices according to different use scenes, thereby improving the sensitivity of the alarm rules and reducing potential security risks.

The followings are apparatus embodiments of the present disclosure. The details not specified in the apparatus embodiments may refer to the corresponding record in the above method embodiments, and will not be repeated herein.

Figure 11:
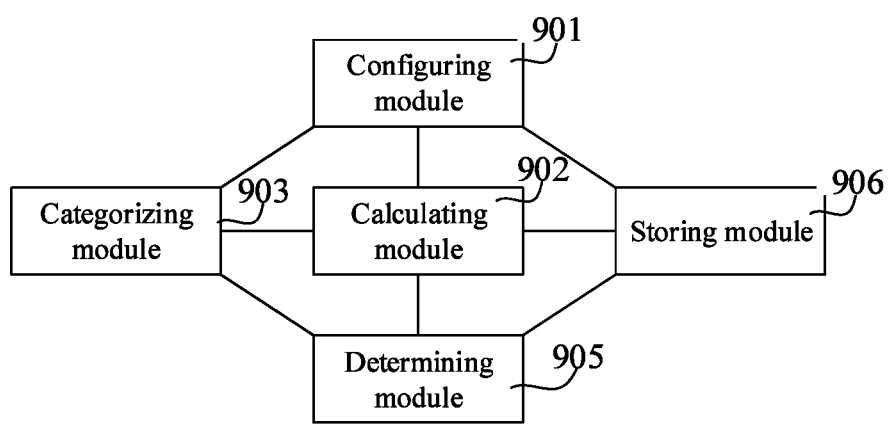
FIG. 11 is a block diagram of an apparatus for configuring an alarm rule for an IoT device according to an exemplary embodiment of the present disclosure.

FIG. 11 is a schematic structural diagram of an apparatus for configuring an alarm rule for an IoT device according to an embodiment of the present disclosure. The apparatus may be practiced as all or a part of a server or an alarm rule recommending module by software, hardware or a combination of the two. The apparatus includes:

a configuring module 901, operable to configure at least two groups of alarm rules for a plurality of IoT devices of the same type in an IoT;

a categorizing module 903, operable to obtain n usage categories of the plurality of IoT devices by categorizing the plurality of IoT devices according to usage characteristics of the plurality of IoT devices;

a calculating module 902, operable to calculate a correlation between the at least two groups of the alarm rules and the n usage categories; and a storing module 906, operable to store a corresponding relationship between a target use category and a target alarm rule whose correlation is higher than a condition;

wherein the configuring module 901 is further operable to: when an IoT device belonging to the target use category is newly added, configure an alarm rule of the newly added IoT device as the target alarm rule.

In an optional embodiment, the at least two groups of the alarm rules include m groups of the alarm rules; an $i^{th}$ category in the n usage categories includes $x_i$ types, m being an integer greater than 1, and i and $x_i$ being integers greater than 0 respectively; and the apparatus further includes a determining module 905; wherein the categorizing module 903 is further operable to: for a $j^{th}$ group of alarm rules in the m groups of the alarm rules, categorize the plurality of IoT devices into y category results according to at least one type under each of the n usage categories, where $y = x_1 x_2 x_3 \ldots x_n$;

the calculating module 902 is further operable to: for each of the y category results, calculate a number of IoT devices configured with the $j^{th}$ group of alarm rules among the IoT devices belonging to a current category result; and the determining module 905 is further operable to: in the y category results, determine a category result in which the number of IoT devices configured with the $j^{th}$ group of alarm rules is the greatest as a target use category corresponding to the $j^{th}$ group of alarm rules;

wherein the $j^{th}$ group of alarm rules is any one of the m groups of the alarm rules.

In an optional embodiment, the at least two groups of the alarm rules include m groups of the alarm rules; an $i^{th}$ category in the n usage categories includes $x_i$ types, m being an integer greater than 1, and i and $x_i$ being integers greater than 0 respectively; and the apparatus further includes a determining module 905; wherein the calculating module 902 is further operable to calculate a theoretical configuration proportion of a $j^{th}$ group of alarm rules in the m groups of the alarm rules, wherein the theoretical configuration proportion is a ratio of a number of IoT devices among the plurality of IoT devices configured with the $j^{th}$ group of alarm rules to a total number of the plurality of IoT devices;

the calculating module 902 is further operable to calculate an actual configuration proportion of each of $x_i$ category results, wherein the actual configuration proportion is a ratio of the number of IoT devices among the plurality of IoT devices configured with the $j^{th}$ group of alarm rules to a number of all IoT devices belonging to a current category result; and the determining module 905 is further operable to determine a category result, in which a difference between the actual configuration proportion and the theoretical configuration proportion is the greatest and the difference is greater than a threshold, as a target use category corresponding to the $j^{th}$ group of alarm rules under the $i^{th}$ category, the threshold being a decimal greater than 0 and less than 1;

wherein the $j^{th}$ group of alarm rules is any one of the m groups of the alarm rules, and the $i^{th}$ category is any one of the n usage categories.

In an optional embodiment, the usage characteristics include at least one of a use duration, a geographical location, a use scene, a topological relation, a use frequency, an average load, or a peak load.

In an optional embodiment, the configuring module 901 is further operable to configure an initial alarm rule for all or part of IoT devices of the same type in the IoT; and the configuring module 901 is further operable to obtain a changed alarm rule by changing the initial alarm rule for part of the plurality of IoT devices according to an accuracy degree of the initial alarm rule during use; wherein the changed alarm rule includes one or more alarm rules.

Figure 12:
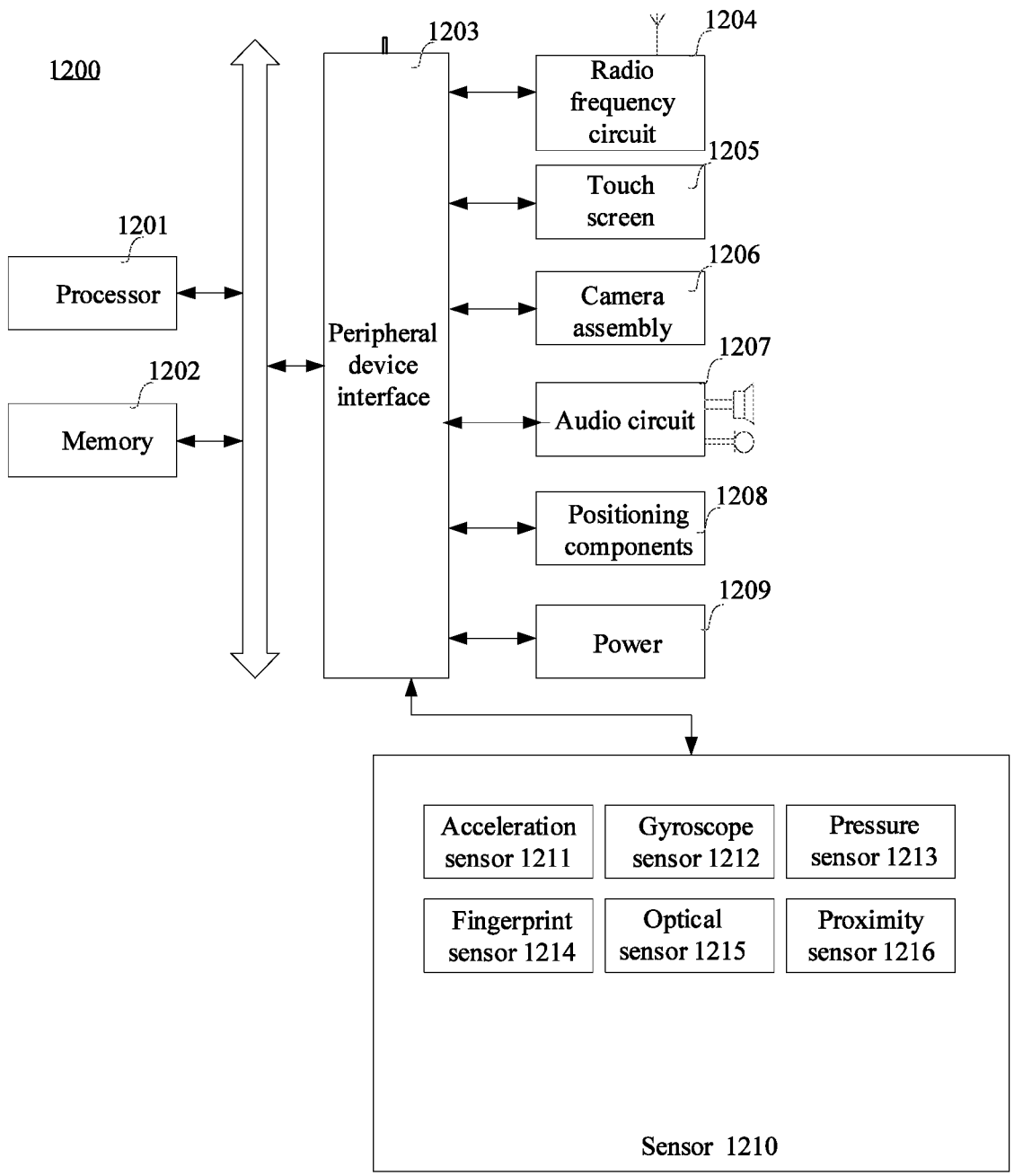
FIG. 12 is a structural block diagram of a computer IoT device according to an exemplary embodiment of the present disclosure.

FIG. 12 is a block diagram of a computer device 1200 in accordance with one embodiment of the present disclosure. The computer device 1200 may be such a portable mobile display device as a smart phone, a tablet PC, a Moving Picture Experts Group Audio Layer III (MP3) player, a Moving Picture Experts Group Audio Layer IV (MP4) player, a laptop, or a desk computer. The computer device 1200 may also be called a user equipment (UE), a portable display device, a laptop display device, a desk display device, or the like.

Generally, the computer device 1200 includes a processor 1201 and a memory 1202.

The processor 1201 may include one or more processing cores, such as a 4-core processor and an 8-core processor. The processor 1201 may be formed by at least one hardware of a digital signal processor (DSP), a field-programmable gate array (FPGA), or a programmable logic array (PLA). The processor 1201 may also include a main processor and a coprocessor. The main processor is a processor for processing the data in an awake state, and is also called a central processing unit (CPU). The coprocessor is a low-power-consumption processor for processing the data in a standby state. In some embodiments, the processor 1201 may be integrated with a graphics processing unit (GPU), which is operable to render and draw the content that needs to be displayed by a display screen. In some embodiments, the processor 1201 may also include an Artificial Intelligence (AI) processor operable to process computational operations related to machine learning.

The memory 1202 may include one or more computer-readable storage mediums, which can be tangible and non-transitory. The memory 1202 may also include a high-speed random-access memory, as well as a non-volatile memory, such as one or more disk storage devices and flash storage devices. In some embodiments, the non-transitory computer-readable storage medium in the memory 1202 is operable to store at least one instruction. The at least one instruction is operable to be executed by the processor 1201 to implement the method for configuring an alarm rule for an IoT device according to the embodiments of the present disclosure.

In some embodiments, the computer device 1200 also optionally includes a peripheral device interface 1203 and at least one peripheral device. For example, the peripheral device includes at least one of a radio frequency circuit 1204, a display panel 1205, a camera component 1206, an audio circuit 1207, a positioning component 1208, or a power source 1209.

The peripheral device interface 1203 may be operable to connect at least one peripheral device associated with an input/output (I/O) to the processor 1201 and the memory 1202. In some embodiments, the processor 1201, the memory 1202 and the peripheral device interface 1203 are integrated on the same chip or circuit board. In some other embodiments, any one or two of the processor 1201, the memory 1202, and the peripheral device interface 1203 may be implemented on a separate chip or circuit board, which is not limited in the present embodiment.

The radio frequency circuit 1204 is operable to receive and transmit a radio frequency (RF) signal, which is also referred to as an electromagnetic signal. The radio frequency circuit 1204 communicates with a communication network and other communication devices via the electromagnetic signal. The radio frequency circuit 1204 converts the electrical signal into the electromagnetic signal for transmission, or converts the received electromagnetic signal into the electrical signal. Optionally, the radio frequency circuit 1204 includes an antenna system, an RF transceiver, one or more amplifiers, a tuner, an oscillator, a digital signal processor, a codec chipset, a subscriber identity module card, and the like. The radio frequency circuit 1204 can communicate with other display devices via at least one wireless communication protocol. The wireless communication protocol includes, but not limited to, the World Wide Web, a metropolitan area network, an intranet, various generations of mobile communication networks (2G, 3G, 4G, and 5G), a wireless local area network, and/or a wireless fidelity (Wi-Fi) network. In some embodiments, the RF circuit 1204 may also include near-field communication (NFC) related circuits, which is not limited in the present disclosure.

The display panel 1205 is operable to display a user interface (UI). The UI may include graphics, text, icons, videos, and any combination thereof. When the display panel 1205 is a touch display screen, the display panel 1205 also has the capacity to acquire touch signals on or over the surface of the display panel 1205. The touch signal may be input into the processor 1201 as a control signal for processing. At this time, the display panel 1205 may also be operable to provide virtual buttons and/or virtual keyboards, which are also referred to as soft buttons and/or soft keyboards. In some embodiments, one display panel 1205 may be disposed on the front panel of the computer device 1200. In some other embodiments, at least two display panels 1205 may be disposed respectively on different surfaces of the computer device 1200 or in a folded design. In further embodiments, the display panel 1205 may be a flexible display screen disposed on the curved or folded surface of the computer device 1200. Even the display panel 1205 may have an irregular shape other than a rectangle; that is, the display panel 1205 may be an irregular-shaped screen. The display panel 1205 may be a liquid crystal display (LCD) panel, an organic light-emitting diode (OLED) panel or the like.

The camera component 1206 is operable to capture images or videos. In some embodiments of the present disclosure, the camera component 1206 includes a front camera and a rear camera. Usually, the front camera is placed on the front panel of the display device, and the rear camera is placed on the back of the display device. In some embodiments, at least two rear cameras are disposed, and are at least one of a main camera, a depth-of-field camera, a wide-angle camera, and or telephoto camera, so as to realize a background blurring function achieved by fusion of the main camera and the depth-of-field camera, panoramic shooting and virtual reality (VR) shooting functions achieved by fusion of the main camera and the wide-angle camera or other fusion shooting functions. In some embodiments, the camera component 1206 may also include a flashlight. The flashlight may be a mono-color temperature flashlight or a two-color temperature flashlight. The two-color temperature flash is a combination of a warm flashlight and a cold flashlight and can be used for light compensation at different color temperatures.

The audio circuit 1207 may include a microphone and a speaker. The microphone is operable to collect sound waves of users and environments, and convert the sound waves into electrical signals which are input into the processor 1201 for processing, or input into the RF circuit 1204 for voice communication. For the purpose of stereo acquisition or noise reduction, there may be a plurality of microphones respectively disposed at different locations of the computer device 1200. The microphone may also be an array microphone or an omnidirectional acquisition microphone. The speaker is then operable to convert the electrical signals from the processor 1201 or the radio frequency circuit 1204 into the sound waves. The speaker may be a conventional film speaker or a piezoelectric ceramic speaker. When the speaker is the piezoelectric ceramic speaker, the electrical signal can be converted into not only human-audible sound waves but also the sound waves which are inaudible to humans for the purpose of ranging and the like. In some embodiments, the audio circuit 1207 may also include a headphone jack.

The positioning component 1208 is operable to locate the current geographic location of the computer device 1200 to implement navigation or location based services (LBS). The positioning component 1508 may be the global positioning system (GPS) from the United States, the Beidou positioning system from China, the Grenas satellite positioning system from Russia or the Galileo satellite navigation system from the European Union.

The power source 1209 is operable to power up various components in the computer device 1200. The power source 1209 may be alternating current, direct current, a disposable battery, or a rechargeable battery. When the power source 1209 includes the rechargeable battery, the rechargeable battery may support wired or wireless charging. The rechargeable battery may also support the fast charging technology.

In some embodiments, the computer device 1200 also includes one or more sensors 1210. The one or more sensors 1210 include, but not limited to, an acceleration sensor 1211, a gyro sensor 1212, a pressure sensor 1213, a fingerprint sensor 1214, an optical sensor 1215 and a proximity sensor 1216.

The acceleration sensor 1211 may detect magnitudes of accelerations on three coordinate axes of a coordinate system established by the computer device 1200. For example, the acceleration sensor 1211 may be operable to detect components of a gravitational acceleration on the three coordinate axes. The processor 1201 may control the touch display panel 1205 to display a user interface in a landscape view or a portrait view according to a gravity acceleration signal collected by the acceleration sensor 1211. The acceleration sensor 1211 may also be operable to collect motion data of a game or a user.

The gyro sensor 1212 can detect a body direction and a rotation angle of the computer device 1200, and can cooperate with the acceleration sensor 1211 to collect a 3D motion of the user on the computer device 1200. Based on the data collected by the gyro sensor 1212, the processor 1201 can serve the following functions: motion sensing (such as changing the UI according to a user's tilt operation), image stabilization during shooting, game control and inertial navigation.

The pressure sensor 1213 may be disposed on a side frame of the computer device 1200 and/or a lower layer of the touch display panel 1205. When the pressure sensor 1213 is disposed on the side frame of the computer device 1200, a user's holding signal to the computer device 1200 can be detected. The processor 1201 can perform left-right hand recognition or quick operation according to the holding signal collected by the pressure sensor 1213. When the pressure sensor 1213 is disposed on the lower layer of the touch display panel 1205, the processor 1201 controls an operable control on the UI according to a user's pressure operation on the touch display panel 1205. The operable control includes at least one of a button control, a scroll bar control, an icon control, or a menu control.

The fingerprint sensor 1214 is co operable nfigured to collect a user's fingerprint. The processor 1201 identifies the user's identity based on the fingerprint collected by the fingerprint sensor 1214, or the fingerprint sensor 1214 identifies the user's identity based on the collected fingerprint. When the user's identity is identified as trusted, the processor 1201 authorizes the user to perform related sensitive operations, such as unlocking the screen, viewing encrypted information, downloading software, paying, and changing configurations. The fingerprint sensor 1214 may be provided on the front, rear, or side of the computer device 1200. When the computer device 1200 is provided with a physical button or a manufacturer's Logo, the fingerprint sensor 1214 may be integrated with the physical button or the manufacturer's Logo.

The optical sensor 1215 is operable to collect ambient light intensity. In one embodiment, the processor 1201 may control the display brightness of the touch display panel 1205 according to the ambient light intensity collected by the optical sensor 1215. For example, when the ambient light intensity is high, the display brightness of the touch display panel 1205 is increased; and when the ambient light intensity is low, the display brightness of the touch display panel 1205 is decreased. In another embodiment, the processor 1201 may also dynamically adjust shooting parameters of the camera component 1206 according to the ambient light intensity collected by the optical sensor 1215.

The proximity sensor 1216, also referred to as a distance sensor, is usually disposed on the front panel of the computer device 1200. The proximity sensor 1216 is operable to capture a distance between the user and a front surface of the computer device 1200. In one embodiment, when the proximity sensor 1216 detects that the distance between the user and the front surface of the computer device 1200 becomes gradually smaller, the processor 1201 controls the touch display panel 1205 to switch from a screen-on state to a screen-off state. When it is detected that the distance between the user and the front surface of the computer device 1200 gradually increases, the processor 1201 controls the touch display panel 1205 to switch from the screen-off state to the screen-on state.

It will be understood by those skilled in the art that the structure shown in FIG. 12 does not constitute a limitation to the computer device 1200, and may include more or less components than those illustrated, or combine some components or adopt different component arrangements.

Figure 13:
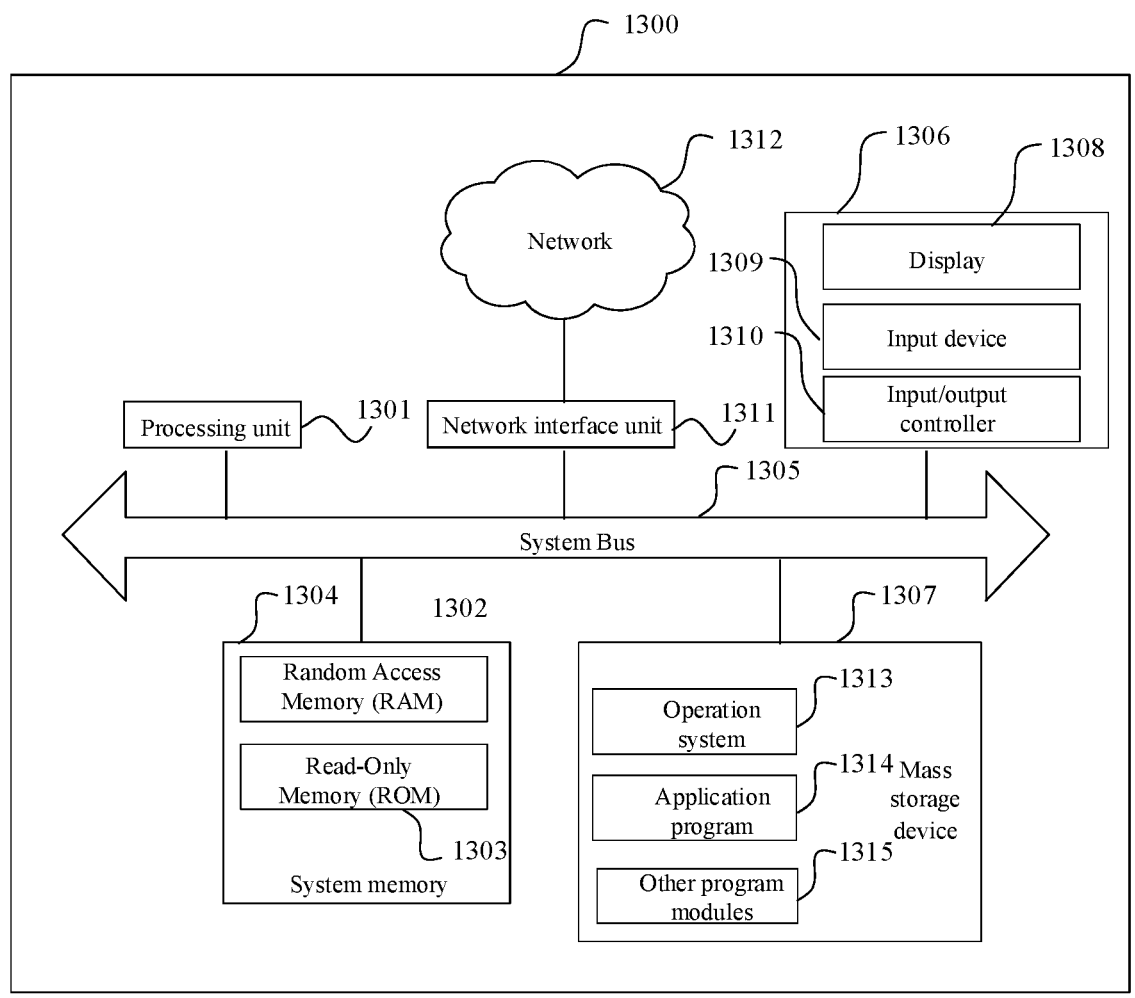
FIG. 13 is a structural block diagram of a server according to an exemplary embodiment of the present disclosure.

FIG. 13 shows a structural block of a server according to an embodiment of the present disclosure. The server cluster formed by the servers can be used to perform the method for configuring an alarm rule for an IoT device according to the above embodiments. For example, the server may be the server in the application environment shown in FIG. 1.

Specifically, the server 1300 includes a processing unit 1301 (such as a central processing unit (CPU), a graphics processing unit (GPU) and a field programmable gate array (FPGA)), a system memory 1304 including a random access memory (RAM) 1302 and a read-only memory (ROM) 1303, and a system bus 1305 connecting the system memory 1004 and the central processing unit 1301. The server 1300 further includes a basic input/output system (I/O system) 1306 which helps transmit information between various components within the server, and a high-capacity storage device 1307 for storing an operating system 1313, an application 1314 and other program modules 1315.

The basic input/output system 1306 includes a display 1308 for displaying information and an input device 1309, such as a mouse and a keyboard, for inputting information by the user. Both the display 1308 and the input device 1309 are connected to the central processing unit 1301 through an input/output controller 1310 connected to the system bus 1305. The basic input/output system 1306 may also include the input/output controller 1310 for receiving and processing input from a plurality of other devices, such as the keyboard, the mouse, or an electronic stylus. Similarly, the input/output controller 1310 further provides output to the display, a printer, or other types of output devices.

The high-capacity storage device 1307 is connected to the central processing unit 1301 through a high-capacity storage controller (not shown) connected to the system bus 1305. The high-capacity storage device 1307 and a server-readable medium associated therewith provide non-volatile storage for the server 1300. That is, the high-capacity storage device 1307 may include the server-readable medium (not shown), such as a hard disk or a CD-ROM driver.

Without loss of generality, the server-readable medium may include a server storage medium and a communication medium. The server storage medium includes volatile and non-volatile, or removable and non-removable media implemented in any method or technology for storage of information such as a server-readable instruction, a data structure, a program module, or other data. The server storage medium includes a RAM, a ROM, an EPROM, an EEPROM, a flash memory or other solid-state storage technologies; a CD-ROM, DVD, or other optical storage; and a tape cartridge, a magnetic tape, a disk storage, or other magnetic storage devices. It may be known by a person skilled in the art that the server storage medium is not limited to above. The above system memory 1304 and the high-capacity storage device 1307 may be collectively referred to as the memory.

According to the various embodiments of the present disclosure, the server 1300 may also be run through a remote server connected to a network via a network, such as the Internet. That is, the server 1300 may be connected to the network 1312 by a network interface unit 1311 connected to the system bus 1305, or may be connected to other types of networks or remote server systems (not shown) with the network interface unit 1311.

The memory includes at least one instruction, at least one program, or a code set or instruction set stored therein. The at least one instruction, the at least one program, or the code set or instruction set is stored in the memory, when loaded and executed by a processor, enables the processor to perform the method according to the above method embodiments.

An embodiment of the present disclosure also provides a terminal. The terminal includes a processor; and a memory storing at least one instruction, at least one program, or a code set or instruction set therein. The at least one instruction, the at least one program, or the code set or instruction set, when loaded and executed by the processor, enables the processor to perform the method according to the above method embodiments.

An embodiment of the present disclosure further provides an IoT device. The IoT device includes a processor; and a memory storing at least one instruction, at least one program, or a code set or instruction set stored therein. The at least one instruction, the at least one program, or the code set or instruction set, when loaded and executed by the processor, enables the processor to perform the method according to the above method embodiments.

An embodiment of the present disclosure further provides a computer-readable storage medium storing at least one instruction, at least one program, or a code set or instruction set therein. The at least one instruction, the at least one program, or the code set or instruction set, when loaded and executed by a processor, enables the processor to perform the method according to the above method embodiments.

It should be understood that the term "and/or" only describes an association relationship between associated objects and indicates that there may be three relationships. For example, A and/or B may indicate that there are three cases where A exists separately, A and B exist at the same time, and B exists separately. In addition, the character "/" herein generally indicates that an "or" relationship exists between contextual objects.

Those skilled in the art can understand that all or part of the steps of the above embodiments may be completed by a computer program to instruct related hardware, and the program may be stored in a computer-readable storage medium. The storage medium may be a read-only memory (ROM), a magnetic disk, an optical disk, or the like.

The foregoing descriptions are merely exemplary embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A method for configuring an alarm rule for an IoT device, comprising:
    configuring m groups of alarm rules for a plurality of IoT devices of the same type in an IoT, m being an integer greater than 1;
    obtaining n usage categories of the plurality of IoT devices by categorizing the plurality of IoT devices according to usage characteristics of the plurality of IoT devices wherein an $i^{th}$ category in the n usage categories comprises $x_i$ types, and i and $x_i$ being integers greater than 0 respectively;
    for a $j^{th}$ group of alarm rules in the m groups of alarm rules obtaining y category results by categorizing the plurality of IoT devices according to at least one type under each of the n usage categories, where $y=x_1 x_2 x_3 \ldots x_n$;

for each of the y category results, calculating a number of IoT devices configured with the $j^{th}$ group of alarm rules among the IoT devices belonging to a current category result; and in the y category results, determining a category result in which the number of IoT devices configured with the $j^{th}$ group of alarm rules is the largest as a usage category having a corresponding relationship with the $j^{th}$ group of alarm rules; and configuring alarm rules of a newly added IoT device to be the group of alarm rules having a corresponding relationship with a usage category of the newly added IoT device, wherein the usage category of the newly added IoT device being one of the n usage categories.

2. The method according to claim 1, wherein the usage characteristics comprise at least one of a use duration, a geographical location, a use scene, a topological relation, a use frequency, an average load, and a peak load.

3. The method according to claim 1, wherein configuring the m groups of alarm rules for the plurality of IoT devices of the same type in the IoT comprises:

configuring an initial alarm rule for all or part of IoT devices of the same type in the IoT; and changing the initial alarm rule for part of the plurality of IoT devices according to an accuracy degree of the initial alarm rule during use to obtain a changed alarm rule;

wherein the changed alarm rule comprises one or more alarm rules.

4. An apparatus, comprising a server, for configuring an alarm rule for an IoT device, comprising:

a processor, comprising:

a configuring module, operable to configure m groups of alarm rules for a plurality of IoT devices of the same type in an IoT, m being an integer greater than 1;

a categorizing module, operable to obtain n usage categories of the plurality of IoT devices by categorizing the plurality of IoT devices according to usage characteristics of the plurality of IoT devices, wherein an $i^{th}$ category in the n usage categories comprises $x_i$ types, and i and $x_i$ being integers greater than 0 respectively, the categorizing module further operable to: for a $j^{th}$ group of alarm rules in the m groups of the alarm rules, obtaining y category results by categorizing the plurality of IoT devices according to at least one type under each of the n usage categories, where $y=x_1 x_2 x_3 \ldots x_n$;

a calculating module, operable to: for each of the y category results, calculate a number of IoT devices configured with the $j^{th}$ group of alarm rules among the IoT devices belonging to a current category result;

a determining module operable to: in the y category results, determine a category result in which the number of IoT devices configured with the $j^{th}$ group of alarm rules is the largest as a usage category having a corresponding relationship with the $j^{th}$ group of alarm rules; and a storing module, operable to store a corresponding relationship between the group of alarm rules and any of the n usage categories where the correlation therebetween is higher than a condition;

wherein the configuring module is further operable to: configure alarm rules of a newly added IoT device to be the group of alarm rules having a corresponding relationship with a usage category of the newly added IoT device, wherein the usage category of the newly added IoT device being one of the n usage categories.

5. An IoT device, comprising: a processor, and a memory storing at least one instruction, at least one program, or a code set or instruction set therein, wherein the at least one instruction, the at least one program, or the code set or instruction set, when loaded and executed by the processor, enables the processor to perform the method for configuring an alarm rule for the IoT device as defined in claim 1.

6. A computer-readable storage medium storing at least one instruction, at least one program, or a code set or instruction set therein, wherein the at least one instruction, the at least one program, or the code set or instruction set, when loaded and executed by a processor, enables the processor to perform the method for configuring an alarm rule for the IoT device as defined in claim 1.

* * * * *